(12) United States Patent
Mohanty et al.

(10) Patent No.: US 11,746,053 B2
(45) Date of Patent: Sep. 5, 2023

(54) REFRACTORY COMPOSITIONS AND IN SITU ANTI-OXIDATION BARRIER LAYERS

(71) Applicant: VESUVIUS USA CORPORATION, Champaign, IL (US)

(72) Inventors: Beda Mohanty, Perrysburg, OH (US); Daniel T Schaner, Medina, OH (US); Roger L Maddalena, Pittsburgh, PA (US)

(73) Assignee: Vesuvius USA Corporation, Champaign, IL (US)

( * ) Notice: Subject to any disclaimer, the term of this patent is extended or adjusted under 35 U.S.C. 154(b) by 0 days.

(21) Appl. No.: 16/961,823

(22) PCT Filed: Jan. 29, 2019

(86) PCT No.: PCT/US2019/015580
§ 371 (c)(1),
(2) Date: Jul. 13, 2020

(87) PCT Pub. No.: WO2019/156845
PCT Pub. Date: Aug. 15, 2019

(65) Prior Publication Data
US 2021/0002176 A1 Jan. 7, 2021

Related U.S. Application Data

(60) Provisional application No. 62/628,487, filed on Feb. 9, 2018.

(51) Int. Cl.
*C04B 35/101* (2006.01)
*C04B 35/622* (2006.01)
*B22D 41/02* (2006.01)
*C22C 1/10* (2006.01)

(52) U.S. Cl.
CPC .......... *C04B 35/1015* (2013.01); *B22D 41/02* (2013.01); *C04B 35/62222* (2013.01); *C22C 1/1015* (2013.01); *C22C 1/1036* (2013.01); *C04B 2235/3201* (2013.01); *C04B 2235/3206* (2013.01); *C04B 2235/3208* (2013.01); *C04B 2235/3217* (2013.01); *C04B 2235/3232* (2013.01); *C04B 2235/3272* (2013.01); *C04B 2235/3418* (2013.01); *C04B 2235/786* (2013.01); *C04B 2235/9676* (2013.01); *C22C 1/1021* (2023.01)

(58) Field of Classification Search
CPC .............. C04B 35/101; C04B 35/1015; C04B 35/043; C04B 35/443; B22D 41/02
See application file for complete search history.

(56) References Cited

U.S. PATENT DOCUMENTS

| 3,615,775 A | 10/1971 | Teeter |
| 3,808,013 A | 4/1974 | Manigault |
| 3,841,884 A | 10/1974 | Farris |
| 3,942,293 A | 3/1976 | Cook |
| 4,039,344 A | 8/1977 | Nishikawa et al. |
| 4,404,262 A | 9/1983 | Watmough |
| 4,430,439 A | 2/1984 | Kleeb |
| 4,751,204 A | 6/1988 | Kyoden et al. |
| 5,043,182 A | 8/1991 | Schultze et al. |
| 5,171,724 A | 12/1992 | Iwadoh et al. |
| 5,302,563 A | 4/1994 | Rumpeltin et al. |
| 5,549,745 A | 8/1996 | Langenohl et al. |
| 5,595,948 A | 1/1997 | Kimura et al. |
| 5,932,506 A * | 8/1999 | Bogan .................. C04B 35/103 501/120 |
| 6,288,001 B1 | 9/2001 | Kiyota et al. |
| 6,395,662 B1 | 5/2002 | Li et al. |
| 6,660,673 B1 | 12/2003 | Amirzadeh-Asl et al. |
| 8,376,318 B2 * | 2/2013 | Villermaux .......... C04B 35/482 501/134 |
| 9,604,882 B2 | 3/2017 | Soudier |
| 10,239,791 B2 | 3/2019 | Eckstein et al. |
| 2006/0033247 A1 | 2/2006 | Hasegawa |

(Continued)

FOREIGN PATENT DOCUMENTS

| JP | S47026409 U | 11/1972 |
| JP | H05185202 A | 7/1993 |

(Continued)

OTHER PUBLICATIONS

Alton T. Tabereaux, "Reviewing advances in cathode refractory materials," JOM 44, 11 (Nov. 1, 1992): 20-26.
Ko, "Role of spinel composition in the slag resistance of AL2O3-spinel and Al2O3—MgO castables", Ceramics International, 28 (2002), pp. 805-810.
Buchel, et al., "Bonite—A new raw material alternative for refractory innovations", 9th Biennial Worldwide Congress on Refractories, pp. 462-467, (2005).
Notice of Reasons for Rejection, issued in Japanese Patent Appln. No. 2020-542789, dated Jan. 10, 2023.

Primary Examiner — Karl E Group
(74) Attorney, Agent, or Firm — MaxGoLaw PLLC

(57) ABSTRACT

A refractory composition for forming a working lining in a metallurgical vessel contains a coarse-grain refractory particle fraction and a fine-grain refractory particle fraction, or at least 0.25% additive calcium oxide, or at least 0.25% titanium dioxide. The coarse-grain refractory particles can include alumina particles, magnesia particles, magnesium aluminate spinel particles, zirconia particles, or doloma particles, or a combination of any of these particles. The fine-grain refractory particles can be comprised of any low-magnesia refractory oxide. The refractory composition can be applied to a metallurgical vessel by spraying, gunning, shotcreting, vibrating, casting, troweling, or positioning preformed refractory shapes, or a combination of any of these techniques. When contacted by molten metal, the molten metal penetrates into the refractory material, wetting the coarse-grain refractory particles, and forming a refractory-metal composite barrier layer that decreases or blocks oxygen transport through the refractory lining.

14 Claims, 6 Drawing Sheets

(56) References Cited

U.S. PATENT DOCUMENTS

| | | | |
|---|---|---|---|
| 2008/0280152 A1 | 11/2008 | Aneziris et al. | |
| 2010/0320153 A1* | 12/2010 | Cousins | B01J 20/0285 |
| | | | 95/134 |
| 2011/0277951 A1* | 11/2011 | Morikawa | B22D 41/505 |
| | | | 264/269 |
| 2012/0018007 A1 | 1/2012 | Villermaux et al. | |
| 2012/0199538 A1* | 8/2012 | Cousins | B01J 20/3234 |
| | | | 210/683 |
| 2016/0185666 A1 | 6/2016 | San-Miguel et al. | |
| 2016/0318814 A1 | 11/2016 | Soudier et al. | |
| 2017/0030647 A1* | 2/2017 | Hershey | C04B 28/06 |

FOREIGN PATENT DOCUMENTS

| | | |
|---|---|---|
| JP | 06227856 A * | 8/1994 |
| JP | H07504642 A | 5/1995 |
| JP | 08034666 A * | 2/1996 |
| JP | 2003261392 A | 9/2003 |
| JP | 2004142957 A * | 5/2004 |
| WO | 1993017984 | 9/1993 |
| WO | 03082500 A1 | 10/2003 |
| WO | 2004035249 A1 | 4/2004 |
| WO | 2007009667 A2 | 1/2007 |
| WO | 2013064668 A1 | 5/2013 |
| WO | 2016153693 A1 | 9/2016 |
| WO | 2018194831 a1 | 10/2018 |

\* cited by examiner

US 11,746,053 B2

REFRACTORY COMPOSITIONS AND IN SITU ANTI-OXIDATION BARRIER LAYERS

CROSS REFERENCE TO RELATED APPLICATIONS

This application is a U.S. national stage application, filed under 35 U.S.C. § 371, of International Application No. PCT/US19/15580 PCT/US2018/064002, which was filed on 29 Jan. 2019, and which claims priority to United States Application No. U.S. 62/628,487, filed 9 Feb. 2018, the contents of each of which are incorporated by reference in this specification.

BACKGROUND

The information described in this background section is not necessarily admitted prior art.

In metallurgical processes, such as casting, molten metal is transported between unit operations in metallurgical vessels. For example, in continuous casting processes, molten steel is tapped from a steelmaking furnace into a ladle. The ladle functions as a transporting vessel within which the molten steel moves from the steelmaking furnace to a casting platform. At the casting platform, the molten steel transfers from the ladle to a tundish. The tundish functions as a metering device that distributes the molten steel through one or more nozzles into molds in a continuous flow.

Metallurgical vessels, such as, for example, ladles and tundishes, must physically contain molten metal at relatively high temperatures, for example, in steelmaking processes, at temperatures greater than 1400° C. (2552° F.), and in some cases greater than 1500° C. or even 1600° C. Accordingly, metallurgical vessels are lined with refractory materials to provide physically-stable and chemically-stable molten metal-contacting surfaces and insulation between the molten metal and the vessel shells, which are typically made of solid steel and therefore are susceptible to overheating and loss of mechanical integrity if contacted by molten metal. Conventionally, the compositions of melt-contacting refractory linings in metallurgical vessels are formulated to be as chemically inert and physically stable as possible with respect to the molten metal contained within the vessels.

Many molten metals and alloys, and particularly molten iron and steel, are reactive with oxygen species such as atmospheric oxygen ($O_2$). The iron in molten steel will react with oxygen species and produce iron oxides. This can be particularly problematic during post-refining transport and casting operations where iron oxides formed in molten iron and steel become solidified oxide inclusions in, and thus decrease the cleanliness of, cast iron and steel products. This problem can be further complicated by the porosity and permeability of melt-contacting refractory linings to atmospheric oxygen ($O_2$). It has been observed, for example, that atmospheric oxygen ($O_2$) tends to transport through melt-contacting refractory linings in metallurgical vessels, toward the refractory-melt interface, where molten iron and other steel constituents (e.g., carbon, silicon, chromium, manganese, etc.) are oxidized.

A variety of refractory products have been developed for metallurgical vessel linings. Nevertheless, enhanced refractory compositions and products for metallurgical vessel linings, which provide improved anti-oxidation barrier properties during use, would be advantageous.

SUMMARY

The invention described in this specification is directed to refractory compositions that provide anti-oxidation barrier properties during use as melt-contacting linings (i.e., working linings) in metallurgical vessels. The invention described in this specification is also directed to refractory working linings formed from the refractory compositions, metallurgical vessels comprising the refractory linings, methods for making the refractory linings and for making metallurgical vessels comprising the refractory linings, and methods of using metallurgical vessels comprising the refractory linings in metallurgical processes. The refractory linings provide increased anti-oxidation barrier properties, characterized by, for example, an in situ chemical etching-like effect and/or a porosity-penetration effect in the refractory lining, infiltration of molten metal into the etched and/or porous refractory lining, and entrapment of the infiltrated molten metal within the refractory lining, thereby forming a refractory-metal composite barrier layer that decreases or blocks oxygen transport through the refractory lining.

For instance, a refractory composition for forming a working lining in a metallurgical vessel comprises, in percent by total mass of the refractory composition, at least 20.0% coarse-grain refractory particles. The coarse-grain refractory particles have a particle size of at least 150 micrometers (+100 mesh). The coarse-grain refractory particles comprise alumina particles, magnesia particles, magnesium aluminate spinel particles, zirconia particles, or doloma particles, or a combination of any thereof. The refractory composition further comprises at least 0.25% additive calcium oxide, and in some cases, at least 1.5%. Alternatively, or in addition, the refractory composition further comprises at least 5.0% low-magnesia oxide, fine-grain refractory particles having a particle size of less than 150 micrometers (−100 mesh). In some cases, the refractory composition further comprises at least 0.25% additive calcium oxide and at least 5.0% low-magnesia oxide, fine-grain refractory particles having a particle size of less than 150 micrometers (−100 mesh). In some cases, the refractory composition further comprises at least 0.25% titanium dioxide.

BRIEF DESCRIPTION OF THE DRAWINGS

Various features and characteristics of the invention described in this specification may be more thoroughly understood by reference to the accompanying figures, in which.

Figure 1:
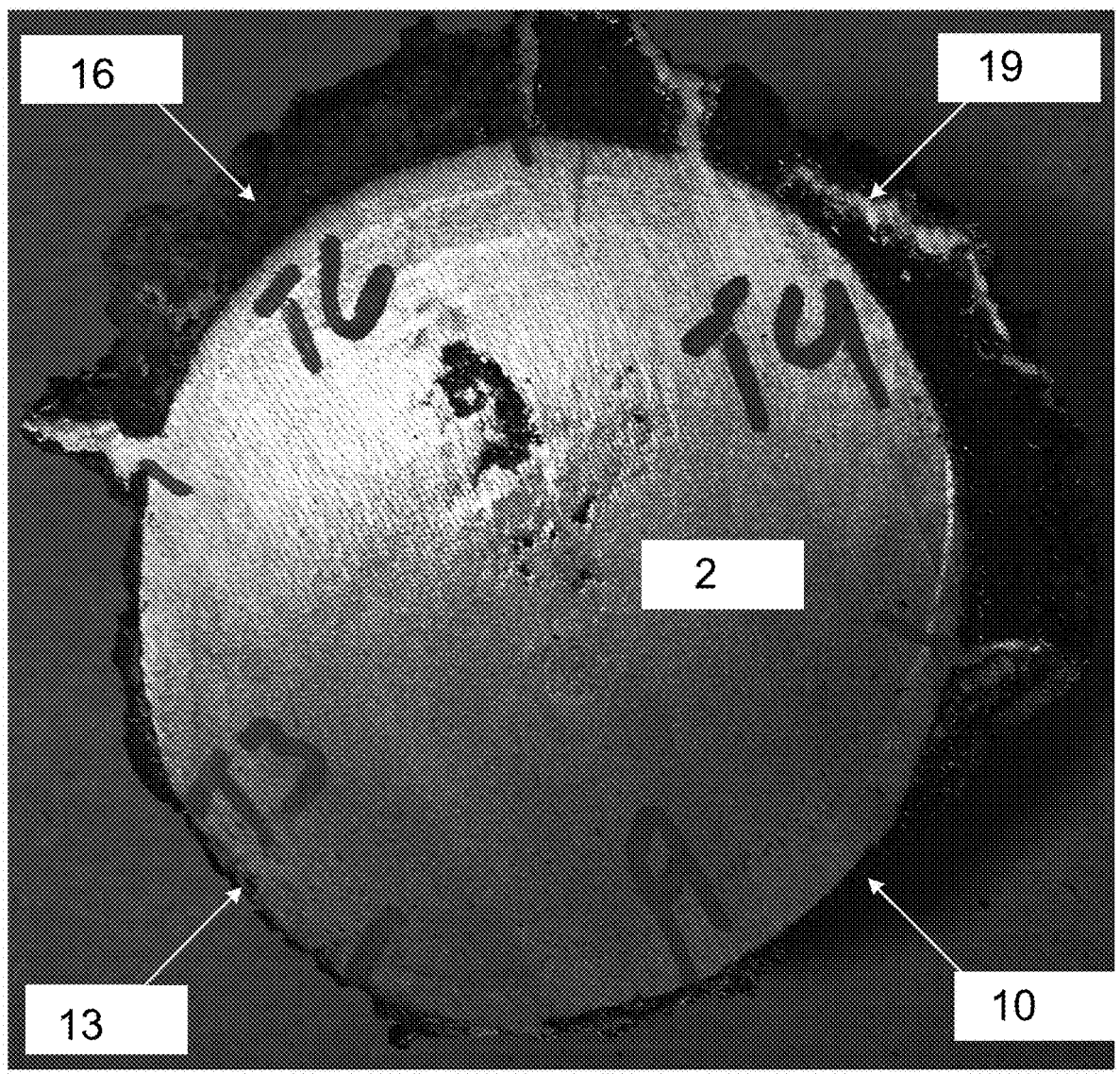
FIG. 1 is a photograph of a cross-section of a steel melt test sample showing four separate zones of attached working lining skull.

The reader will appreciate the foregoing features and characteristics, as well as others, upon considering the following detailed description of the invention.

DESCRIPTION

The refractory compositions described in this specification produce working linings or other refractory structures that provide anti-oxidation barrier properties during use in metallurgical vessels. As used in this specification, including the claims, the term "working lining" means an innermost refractory layer that contacts molten metal contained in a metallurgical vessel. As used in this specification, including the claims, the term "metal" means both metals and metallic alloys.

A tundish used in steel continuous casting processes, for example, can comprise a refractory lining structure comprising at least two layers: (1) a permanent or semi-permanent refractory "safety lining" that contacts the outer metal shell of the tundish or, in some cases, an insulating fiberboard located between the outer metal shell and the safety lining; and (2) an innermost, melt-contacting refractory "working lining" applied over the safety lining. Safety linings are commonly constructed of castable refractory compositions or refractory bricks assembled and optionally mortared into a lining structure immediately adjacent to and contacting the outer metal shell of the tundish (or interposed fiberboard insulation). Working linings are commonly constructed of monolithic refractory layers applied over the safety linings using application techniques including, but not necessarily limited to, spraying, gunning, shotcreting, vibrating (e.g., dry-vibrating), casting (e.g., pre-casting), troweling or other manual application, or positioning of preformed refractory shapes formed from a refractory composition (e.g., refractory boards or wall panels). In some implementations, a tundish can comprise a refractory structure comprising three or four layers: (1) the safety lining (optionally with an underlying fiberboard insulation layer); (2) an intermediate refractory "back-up lining" applied over the safety lining that functions as a separation layer to facilitate metal skull removal after the completion of a continuous casting campaign; and (3) the working lining applied over the back-up lining.

After the completion of a continuous casting campaign, residual steel that did not drain from a tundish can be cooled and solidified to form a skull, which adheres to the working lining. The skull can be removed by inverting the tundish in an operation referred to as "deskulling." The mass of the skull under the force of gravity causes a separation of the working lining from the underlying safety lining, which remains secured within the inverted tundish and does not fall out with the skull. The tundish can then be reprocessed for another continuous casting campaign by applying a new working lining over the safety lining, or applying both a new back-up lining and a new working lining.

The refractory compositions described in this specification are formulated in terms of chemical composition and particle size to produce working linings in metallurgical vessels that are infiltrated by the molten metal contained within the metallurgical vessels. The infiltrating molten metal penetrates into porosity in the refractory composition, wets coarse-grain refractory particles in the refractory composition, and becomes entrapped within the working lining below the surface of the applied lining. The penetration into the porosity, the wetting of the coarse-grain refractory particles, and the entrapment of the infiltrating molten metal produces, in situ, a refractory-metal composite anti-oxidation barrier that decreases or blocks oxygen transport through the refractory lining. Not intending to be bound by theory, it is believed that the infiltration and entrapment of the molten metal is facilitated by an in situ chemical etching-like effect in which iron oxides produced locally at the melt-refractory interface chemically react with constituents in the applied refractory composition to produce relatively low melting point compounds that melt out of the working lining, and are replaced by the molten metal.

In metallurgical operations such as steel continuous casting from tundishes having refractory linings, atmospheric oxygen ($O_2$) and moisture ($H_2O$) can diffuse or otherwise transport from the ambient environment, through the refractory linings, including the working lining, and reach the refractory-melt interface at the surface of the working lining. At this interface, the oxygen and moisture can react with and oxidize the molten iron, producing iron oxides, particularly iron(II) oxide (FeO) in low carbon steels. In more highly alloyed steels, the oxygen and moisture can also react with and oxidize alloying elements such as carbon, silicon, chromium, manganese, and the like. As described above, the formation of oxides such as FeO in continuous casting tundishes is problematic because the oxides can solidify as non-metallic inclusions in the cast steel products, which undesirably decreases the cleanliness of the steel alloy. Accordingly, it is desirable to block or otherwise decrease the transport of oxygen and moisture through refractory working linings in tundishes and other metallurgical vessels.

Iron oxides such as FeO also can react with the constituent oxides in refractory linings in metallurgical vessels. For example, iron oxides can react with calcium oxide or calcium oxide-containing materials (e.g., lime, clays, cements, soda-lime glasses, and the like) present in refractory linings (as binder materials, for example) to produce compounds having melting point temperatures less than the temperature of the molten metal contained within the vessel (e.g., less than 1400° C., which is less than the melting point temperature of many steel alloys). Likewise, iron oxides can react with other refractory constituents (e.g., silica and alumina) to produce relatively low-melting compounds. Additionally, the relative size of the constituent particles forming an applied refractory lining can affect the kinetics of reactions between iron oxides and the constituent oxides. Generally, the smaller the constituent refractory oxide particles (e.g., particles containing calcium oxide (calcia), alumina, silica, mullite, or similar low-magnesia oxides), the more rapidly these refractory oxides will react with molten iron oxides and produce lower melting point temperature compounds.

By formulating the chemical composition and particle size distribution of refractory compositions to facilitate limited reactivity with iron oxides produced in situ, the refractory compositions can be engineered for the partial and limited disintegration of the applied refractory composition, resulting from the chemical etching-like effect of the iron oxides on the calcium oxide-containing binder materials and the fine-grain refractory particles in the applied refractory composition. Coarse-grain refractory particles, however, are generally large enough that iron oxide reactions do not substantially affect the integrity or size of these particles. The effectively etched-out materials are replaced, in situ, with molten metal, which wets and infiltrates the remaining coarse-grain refractory particles, forming a metallic phase that cements the coarse-grain refractory particles. The coarse-grain refractory particles thus form a refractory phase in a refractory-metal composite material. This approach to refractory design—i.e., the promotion of molten metal penetration into, and the partial destruction of, a melt-contacting refractory layer in a metallurgical vessel—is entirely counterintuitive and contrary to conventional wisdom in the field. This is so because the promotion of molten metal penetration into porosity, and a chemical etching-like effect and metal infiltration, would be expected to compromise the structural integrity of a refractory working lining and be counterproductive in metal production operations. Notwithstanding the conventional wisdom, this approach unexpectedly produces, in situ, a refractory-metal composite anti-oxidation barrier that decreases or blocks oxygen transport through the refractory lining.

The in situ anti-oxidation barrier layers produced from the refractory compositions described in this specification can be used as working linings in metallurgical vessels, particularly tundishes for the continuous casting of steel. A working lining for a metallurgical vessel can comprise a refractory phase and a metallic phase. The refractory phase can comprise coarse-grain refractory particles. The coarse-grain refractory particles can comprise alumina particles, magnesia particles, magnesium aluminate spinel particles, zirconia particles, or doloma particles, or a combination of any thereof. The metallic phase can comprise molten metal (e.g., iron or steel) wetting and infiltrating the coarse-grain refractory particles of the refractory phase. The metallic phase penetrates the refractory phase and the two phases together form a refractory-metal composite material. The working lining can be formed from a refractory composition comprising, in percent by total mass of the refractory composition, at least 20% of the coarse-grain refractory particles. The refractory composition can also comprise one or more of: (i) at least 1.5% additive calcium oxide; or (ii) at least 5.0% low-magnesia oxide, fine-grain refractory particles having a particle size of less than 150 micrometers (−100 mesh); or (iii) at least 0.25% additive calcium oxide and at least 5.0% low-magnesia oxide, fine-grain refractory particles having a particle size of less than 150 micrometers (−100 mesh); or (iv) at least 0.25% titanium dioxide.

The metal forming the metallic phase infiltrates the porosity in the applied refractory composition and the inter-granular spaces among the coarse-grain refractory particles forming the refractory phase. These inter-granular spaces are formed in situ from the chemical etching-like effect of the iron oxides on the calcium oxide-containing binder materials, or the fine-grain refractory particles, or both, in the applied refractory composition. The resulting refractory-metal composite barrier layer decreases or blocks oxygen transport through the working lining because the porosity and inter-granular space are filled with infiltrated metal, which is entrapped among the coarse-grain refractory particles. Not intending to be bound by theory, it is believed that the entrapped metal forming the metallic phase becomes a stagnant phase within the working lining during use (i.e., no bulk fluid motion or intermixing with bulk molten metal contained in a metallurgical vessel). The entrapment and stagnation of the metal within the porosity and inter-granular spaces blocks or decreases the diffusion or other transport of oxygen and moisture through the working lining, thereby preventing or decreasing the oxygen contamination of bulk molten metal contained in a metallurgical vessel.

The refractory compositions, particularly monolithic sprayable, gunnable, shotcrete, castable, and dry-vibratable refractory compositions formulated for in situ application as metallurgical vessel working linings, can contain both course-grain refractory particles and fine-grain refractory particles. As used in this specification, including the claims, the term "course-grain refractory particles" means particles having a particle size of at least (i.e., greater than or equal to) 150 micrometers, and the term "fine-grain refractory particles" means particles having a particle size of less than 150 micrometers. Particle sizes of free-flowing powders can be measured using dry sieve analysis in accordance with ASTM C 92-95 (2015): Standard Test Methods for Sieve Analysis and Water Content of Refractory Materials, which is incorporated-by-reference into this specification, and wherein course-grain refractory particles are retained on a Tyler Standard 100 mesh (U.S. Standard Sieve Size No. 100), and fine-grain refractory particles pass a Tyler Standard 100 mesh (U.S. Standard Sieve Size No. 100). All mesh values specified in this specification are expressed as Tyler Standard unless otherwise indicated. Particle sizes of constituent particles in applied refractory compositions (e.g., in applied-and-cured or used working linings removed from metallurgical vessels), or otherwise in formed refractory articles, can be measured as a sample mean by imaging particle analysis in accordance with ISO 13322-1:2014: Particle size analysis—Image analysis methods—Part 1: Static image analysis methods, which is incorporated-by-reference into this specification.

The refractory compositions for forming working linings in metallurgical vessels can comprise, in percent by total mass of the refractory composition, at least 20.0% coarse-grain refractory particles having a particle size of at least 150 micrometers (+100 mesh), wherein the coarse-grain refractory particles comprise alumina particles, magnesia particles, magnesium aluminate spinel particles, zirconia particles, or doloma particles, or a combination of any thereof. The refractory compositions can further comprise one or more of: (i) at least 1.5% additive calcium oxide; or (ii) at least 5.0% low-magnesia oxide, fine-grain refractory particles having a particle size of less than 150 micrometers (−100 mesh); or (iii) at least 0.25% additive calcium oxide and at least 5.0% low-magnesia oxide, fine-grain refractory particles having a particle size of less than 150 micrometers (−100 mesh); or (iv) at least 0.25% titanium dioxide. In this specification, including the claims, when a mass percentage of an oxide component in the refractory composition is specified, the mass percentage is measured by X-ray fluorescence (XRF) analysis performed in accordance with ISO 12677:2011: Chemical analysis of refractory products by X-ray fluorescence (XRF)—Fused cast-bead method, which is incorporated-by-reference into this specification. Specified mass percentages of particulate components in the refractory compositions are on a dry mass basis (i.e., without added water) and are measured by dry weighing operations.

Not intending to be bound by theory, it is believed that a minimum amount of at least 0.5% additive calcium oxide (CaO), or a minimum amount of at least 5.0% low-magnesia oxide, fine-grain refractory particles, or both, in the formulation react with iron oxides forming in situ at the refractory-metal interface, including inside pores in the applied refractory material. The iron oxides formed in situ chemically-etch the inter-granular material between the coarse-grain refractory particles. When molten metal (e.g., molten iron or steel) initially contacts the refractory composition, as applied in a metallurgical vessel, iron in the molten metal chemically reacts with oxygen transporting though the applied refractory composition, producing iron oxides in situ, and these iron oxides chemically react with at least a portion of the low-magnesia oxide, fine-grain refractory particles, or the inter-granular calcium oxide, or both, present in the applied refractory composition. The chemical reactions produce low-melting compounds that melt-out of the applied refractory composition, at least partially, and form inter-granular space among the coarse-grain refractory particles in addition to the initial porosity. As described above, the resulting inter-granular space and initial porosity is infiltrated with molten metal that penetrates into the applied refractory composition, becoming entrapped and stagnated, in situ, forming a refractory-metal composite anti-oxidation barrier layer.

The refractory compositions can comprise, in percent by total mass of the refractory composition, at least 20.0% coarse-grain refractory particles, or any sub-range subsumed therein, such as, for example, at least 25.0%, at least 30.0%, at least 35.0%, at least 40.0%, at least 45.0%, at least 50.0%, at least 55.0%, at least 60.0%, at least 65.0%, at least 70.0%, at least 75.0%, up to 95.0%, up to 90.0%, up to 85.0%, up to 80.0%, up to 75.0%, up to 70.0%, 20.0-95.0%, 45.0-95.0%, 45.0-85.0%, 45.0-75.0%, 50.0-75.0%, 50.0-65.0%, 55.0-70.0%, 50.0-60.0%, or 60.0-75.0%. The coarse-grain refractory particles can be comprised of refractory materials that are stable under metallurgical-use conditions and relatively inert to iron oxide reactions. The coarse-grain refractory particles can comprise stable oxide particles such as, for example, alumina particles, magnesia particles, magnesium aluminate spinel particles, zirconia particles, or doloma particles, or a combination of any thereof. Examples of suitable coarse-grain (+100 mesh) refractory particles include, without limitation, tabular alumina, calcined alumina, fused alumina (e.g., brown fused alumina), dead-burned magnesite, fused magnesite, sintered magnesium aluminate spinel, fused magnesium aluminate spinel, fused zirconium dioxide, dead-burned dolomite, or fused doloma, or a combination of any thereof. In some cases, the coarse-grain refractory particles are essentially free of lime (calcium oxide), olivine, and silica. In some cases, the coarse-grain refractory particles are essentially free of silica. In some cases, the composition is essentially free of silica. As used in this specification, including the claims, the term "essentially free" means that the specified component is present, if at all, at no more than incidental impurity levels.

In some cases, the refractory compositions can comprise coarse-grain refractory particles (e.g., alumina particles or magnesia particles) having particle sizes of at least 150 micrometers (+100 mesh), at least 180 micrometers (+80 mesh), at least 210 micrometers, (+65 mesh), at least 250 micrometers (+60 mesh), at least 300 micrometers (+48 mesh), at least 350 micrometers (+42 mesh), at least 420 micrometers (+35 mesh), at least 500 micrometers (+32 mesh), at least 600 micrometers (+28 mesh), at least 700 micrometers (+24 mesh), at least 1000 micrometers (+16 mesh), at least 1.2 millimeters (+14 mesh), at least 1.4 millimeters (+12 mesh), at least 1.7 millimeters (+10 mesh), or at least 2.0 millimeters (+9 mesh). In some cases, the refractory compositions can comprise coarse-grain refractory particles (e.g., alumina particles or magnesia particles) having particle sizes in the range of 150 micrometers to 4.8 millimeters (+100 mesh; −4 mesh), or any sub-range subsumed therein, such as, for example, 150-2000 micrometers (+100 mesh; −9 mesh), 150-1000 micrometers (+100 mesh; −16 mesh), 150-500 micrometers (+100 mesh; −32 mesh), 150-600 micrometers (+100 mesh; −28 mesh), or 300-600 micrometers (+48 mesh; −28 mesh).

The refractory compositions can comprise, in percent by total mass of the refractory composition, at least 5.0% low-magnesia oxide, fine-grain refractory particles, or any sub-range subsumed therein, such as, for example, at least 10.0%, at least 15.0%, at least 25.0%, at least 30%, at least 35.0%, at least 40%, at least 45.0%, at least 50.0%, up to 60.0%, up to 55.0%, up to 50.0%, up to 45.0%, up to 40.0%, up to 35.0%, 5.0-55.0%, 15.0-55.0%, 25.0-55.0%, 25.0-50.0%, 25.0-45.0%, 25.0-40.0%, 25.0-35.0%, 30.0-45.0%, or 30.0-40.0%. The low-magnesia oxide, fine-grain refractory particles can be comprised of refractory materials that are reactive with iron oxide under metallurgical-use conditions and produce low-melting compounds. High-magnesia oxides, such as magnesia and olivine, will react with iron oxide under metallurgical-use conditions, but the resulting reaction products have relatively high melting point temperatures (e.g., melting point temperatures greater than 1600° C., which is higher than the melting point temperatures of most steels) and will not appreciably melt when contacting molten metal.

For example, magnesia will react with iron oxide to produce solid-state magnesiowüstite at temperatures of 1300° C. and up to and exceeding 2400° C. The presence of fine-grain refractory particles comprising high levels of magnesia in the refractory composition can result in the formation of a magnesiowüstite crust at the melt-refractory interface on the surface of the applied refractory composition. A magnesiowüstite crust formed on the surface of the applied refractory composition could block molten metal from penetrating into the refractory composition, and thus prevent the chemical etching-like effect and stop the infiltration of molten metal among the coarse-grain refractory particles.

Accordingly, in some cases, at least 5.0% of the refractory composition by total mass should be low-magnesia oxide, fine-grain refractory particles, wherein "low-magnesia oxide" means oxides that contain less than 50% magnesia by total mass of the oxide composition. For example, magnesia particles in the form of dead-burned magnesite contain at least 70% magnesium oxide by mass, balance incidental impurities, and can contain up to 99.999% (5N) magnesium oxide by mass, depending on grade and mineralogical source. Similarly, olivine particles and most grades of doloma particles contain the equivalent of about 60% MgO by mass. Magnesia particles, olivine particles, and doloma particles, therefore, are not low-magnesia oxides particles. Magnesium aluminate spinel particles ($MgAl_2O_4$/$MgO.Al_2O_3$), on the other hand, generally contain up to a maximum of 40% magnesia, even in magnesia-rich grades (e.g., the magnesia-rich spinel MR 66 grade contains a maximum of 35% magnesia). Magnesium aluminate spinel particles therefore are low-magnesia oxide particles.

In some cases, the amount of high-magnesia oxide, fine-grain refractory particles (i.e., fine-grain refractory particles containing 50% magnesia or more by total mass of the oxide composition—e.g., magnesia particles, olivine particles, or doloma particles) should be minimized in the refractory compositions. For example, in some cases, high-magnesia oxide, fine-grain refractory particles can be present in the refractory compositions up to a maximum of 75.0%, up to 50.0%, up to 25.0%, up to 15.0%, up to 10.0%, or up to 5.0%, by mass. In some cases, high-magnesia oxide, fine-grain refractory particles may be present in the refractory composition at no more than incidental impurity levels. And, in some cases, the amount of high-magnesia oxide, fine-grain refractory particles present in the refractory composition, if any, does not exceed the amount of low-magnesia oxide, fine-grain refractory particles, on a mass basis.

The low-magnesia oxide, fine-grain refractory particles can comprise oxide particles such as, for example, alumina particles, silica particles, mullite particles, calcium oxide particles, titanium dioxide particles, magnesium-aluminate spinel particles, or a combination of any thereof. Examples of fine-grain (−100 mesh) refractory particles suitable for the refractory compositions include, without limitation, tabular alumina, calcined alumina, fused alumina (e.g., brown fused alumina), reactive alumina, hydratable alumina (e.g., Alpha-bond products, available from Almatis GmbH), mullite, chamotte, aluminum silicates (e.g., kyanite, andalusite, sillimanite), fireclay, fly ash, calcined bauxite, foundry sand, quartz, fumed (pyrogenic) silica, precipitated (amorphous) silica, silica fume (microsilica), quicklime (burnt lime), crude titanium dioxide (e.g., granular natural or synthetic rutile), anatase, ilmenite, purified $TiO_2$ powder (e.g., pigment-grade $TiO_2$ powder), sintered spinel, or fused spinel, or a combination of any thereof.

In some cases, the refractory compositions can comprise low-magnesia, fine-grain refractory particles (e.g., alumina particles) having particle sizes of less than 150 micrometers (−100 mesh), less than 125 micrometers (−115 mesh), less than 105 micrometers (−150 mesh), less than 88 micrometers (−170 mesh), less than 74 micrometers (−200 mesh), less than 63 micrometers (−250 mesh), less than 53 micrometers (−270 mesh), less than 44 micrometers (−325 mesh), or less than 37 micrometers (−400 mesh).

The refractory compositions can comprise, in percent by total mass of the refractory composition, at least 0.25% "additive calcium oxide," or any sub-range subsumed therein, such as, for example, at least 0.5%, at least 0.7%, at least 0.9%, at least 1.0%, at least 1.5%, at least 2.0%, at least 2.5%, at least 3.0%, up to 20.0%, up to 15.0%, up to 12.0%, up to 10.0%, up to 5.0%, up to 3.0% up to 2.5%, 0.25-15.0%, 0.5-15.0%, 0.5-10.0%, 0.5-9.9%, 0.5-5.0%, 0.5-3.0%, 0.5-2.5%, 1.0-10.0%, 1.0-5.0%, or 1.0-3.0%. As used in this specification, including the claims, the term "additive calcium oxide" means calcium oxide present in the composition from sources other than the coarse-grain refractory particles. Some grades of coarse-grain refractory particles include calcium oxide (calcia) or other calcium-containing oxides as incidental impurities or as substantial constituents. For example, some grades of dead-burned magnesite can contain up to 3% by weight calcium oxide and other incidental impurities interspersed within the predominantly magnesium oxide particles. Similarly, some grades of doloma particles can contain up to 70% by weight calcium oxide. Any calcium oxide present in the refractory compositions from the coarse-grain refractory particles does not contribute to the "additive calcium oxide." Rather the "additive calcium oxide" is present in the refractory compositions from the fine-grain refractory particles, binder components, or other additives, or a combination of any thereof.

When the refractory compositions are applied to metallurgical vessels, such as, for example, to form working linings in tundishes, additive calcium oxide present in the fine-grain refractory particles, binder components, or other additives, is localized in the inter-granular space between the coarse-grain refractory particles, where the additive calcium oxide is available to react with iron oxides and form low-melting point compounds that melt out of the applied refractory composition and are replaced by molten metal. In contrast, non-additive calcium oxide present in coarse-grain refractory particles such as magnesia or doloma particles may be shielded from reaction with iron oxides by the magnesia or other predominant refractory oxide component in the particles.

Therefore, at least 0.25% additive calcium oxide in the refractory compositions may be useful to promote the chemical etching-like effect, wetting of the coarse-grain refractory particles, and infiltration of the molten metal into the applied refractory compositions. Additive calcium oxide can be differentiated from non-additive calcium oxide in refractory compositions using X-ray diffraction (XRD) analysis in combination with scanning electron microscopy, energy-dispersive spectroscopy (SEM-EDS). The additive calcium oxide can be provided in the refractory compositions in the form of calcium oxide-containing fine-grain refractory particles, binder materials, or additives, or a combination of any thereof. For example, the calcium oxide can be provided in the refractory composition from sources including, without limitation, lime (e.g., hydrated (slaked) lime, quicklime (burnt lime)), fused di-calcium silicate, belite, calcium hexa-aluminate (e.g., hibonite, SLA-92 (available from Almatis GmbH), Bonite (available from Almatis GmbH)), calcium bentonite, calcium aluminate cement (e.g., SECAR® 71 cement), Portland cement, clay (e.g., ball clay), or soda-lime glasses, or a combination of any thereof.

The refractory composition can comprise, in percent by total mass of the refractory composition, at least 0.25% titanium dioxide, or any sub-range subsumed therein, such as, for example, at least 0.5%, at least 1.0%, at least, 2.0%, at least 2.5%, at least 3.0%, at least 5.0%, at least 7.5%, at least 8%, up to 15.0%, up to 12.0%, up to 10.0%, up to 5%, up to 3%, 0.1-15.0%, 0.25-15.0%, 1.0-15.0%, 1.0-12.0%, 1.0-10.0%, 2.5-15.0%, 2.5-12.0%, 2.5-10.0%, 3.0-15.0%, 3.0-12.0%, 0.1-9.5%, 3.0-10.0%, or 3.0-9.0%. The addition of titanium dioxide-containing components (e.g., rutile or pigment-grade $TiO_2$ powder) as a fine-grain refractory particle or additive can increase the wettability of molten steel on coarse-grain refractory particles (e.g., coarse-grain alumina particles or coarse-grain magnesia particles). Therefore, while not intending to be bound by theory, the presence of titanium dioxide in the refractory composition is believed to increase the penetration of molten steel into the applied refractory composition, through pores and the etched inter-granular spaces, and thus increase the uniformity, depth, and rate of metal infiltration into the coarse-grain refractory particles, and increase the uniformity, depth, and rate of the in situ formation of the refractory-metal composite anti-oxidation barrier layer.

The titanium dioxide, when present in the refractory compositions, can be added as natural or synthetic rutile particles, anatase particles, ilmenite particles, pigment-grade $TiO_2$ powder, or other $TiO_2$-containing particulate sources, in some cases at least partially in fine-grain particle form (i.e., having particle sizes less than less than 150 micrometers (−100 mesh)). In some cases, titanium dioxide can be provided in the refractory composition from other refractory particles. For example, brown fused alumina can contain about 2-4% $TiO_2$ by mass interspersed within the $Al_2O_3$ particles. Coarse-grain or fine-grain brown fused alumina particles can therefore be used to provide titanium dioxide to the refractory composition, alone or in combination with additional titanium dioxide-providing ingredients such as natural or synthetic rutile particles, anatase particles, ilmenite particles, pigment-grade $TiO_2$ powder, or other $TiO_2$-containing particulate sources, in some cases as fine-grain particles, at least in part.

In some cases, the refractory compositions can comprise, in percent by total mass of the refractory composition, up to 25% silica, or any sub-range subsumed therein, such as, for example, up to 15%, up to 10%, up to 5%, up to 3.0% silica up to 2.5%, up to 2.0%, up to 1.5%, up to 1.1%, up to 1.0%, up to 0.5%, up to 0.1%, 0.1-3.0%, or 0.1-2.5%. Because iron oxides can react with silica and form low-melting compounds under metallurgical use conditions, silica present in the refractory compositions can be provided in the form of silica-containing fine-grain refractory particles, binder materials, or additives, or a combination of any thereof.

The refractory compositions can additionally comprise calcium-free binders such as mono-aluminum phosphate (MAP) binders, hydratable alumina binders (e.g., Alphabond products, available from Almatis GmbH), organic binders (e.g., phenols, furfural, organic resins, or the like), organic fibers (e.g., cellulosic fibers), dispersing agents (e.g., lignosulfonates or lignosulfonate salts), plasticizers (e.g., ball clay), anti-foaming agents, de-airing agents, retarding agents (e.g., citric acid or boric acid), Epsom salts, boron oxides, metals (e.g., aluminum particles), carbon (e.g., carbon black or graphite), or a combination of any thereof. The refractory compositions can also optionally comprise non-oxide refractory or other non-oxide ceramic components such as, for example, carbides (e.g., silicon carbide, aluminum carbide, titanium carbide, cementite, or the like), nitrides (e.g., silicon nitride, aluminum nitride, titanium nitride, boron nitride, or the like), sulfides, silicides, aluminides, or borides, or a combination of any thereof. While the refractory compositions can comprise any combination of any of these optional components, the refractory compositions can also be essentially free of any of these components, or essentially free of any combination of these components.

The refractory compositions can comprise any combination of at least 20.0% coarse-grain refractory particles and at least 5.0% low-magnesia oxide, fine-grain refractory particles, in percent by total mass of the refractory composition. For example, the refractory compositions can comprise at least 50.0% coarse-grain refractory particles, and at least 25.0% fine-grain refractory particles; or at least 55.0% coarse-grain refractory particles, and at least 30.0% fine-grain refractory particles; 45.0-75.0% coarse-grain refractory particles, and 25.0-55.0% fine-grain refractory particles; or 55.0-70.0% coarse-grain refractory particles, and 30.0-45.0% fine-grain refractory particles; or any other subsumed combination of coarse-grain and fine-grain refractory particles.

The combined amounts of the coarse-grain refractory particles and the fine-grain refractory particles in the refractory compositions can comprise at least 80%, at least 85%, at least 90%, or at least 95% of the total mass of the refractory composition. The combined amounts of binders and other additives in the refractory compositions can comprise less than 20%, less than 15%, less than 10%, or less than 5% of the total mass of the refractory composition.

In some cases, the refractory composition can comprise, in percent by total mass of the refractory composition (as measured by XRF analysis): at least 80.0% alumina; up to 25.0% silica; up to 3.0% iron oxides; at least 0.25% calcium oxide; at least 0.1% magnesia; up to 3.0% alkali oxides; and up to 15.0% titanium dioxide. The refractory composition can comprise at least 80.0% alumina, or any sub-range subsumed therein, such as, for example, at least 85.0%, at least 90.0%, at least 95.0%, 80.0-99.0%, 80.0-95.0%, 85.0-95.0%, 90.0-99.0%, or 90.0-95.0%. The refractory composition can comprise up to 25.0% silica, or any sub-range subsumed therein, such as, for example, up to 3.0%, up to 2.5%, up to 2.0%, up to 1.5%, up to 1.1%, up to 1.0%, up to 0.5%, up to 0.1%, 0.1-3.0%, or 0.1-2.5%. The refractory composition can comprise up to 3.0% iron oxides, or any sub-range subsumed therein, such as, for example, up to 2.0%, up to 1.0%, up to 0.5%, up to 0.3%, up to 0.2%, up to 0.1%, or 0.1-0.5%. The refractory composition can comprise up to 3.0% alkali oxides, or any sub-range subsumed therein, such as, for example, up to 2.0%, up to 1.0%, up to 0.9%, up to 0.5%, up to 0.2%, or up to 0.1%. In some cases, the refractory composition can be essentially free from iron oxides, free from added iron oxides, or may have an iron oxide content of 2.0 wt % or less, 1.0 wt % or less, 0.5 wt % or less, 0.3 wt % or less, 0.2 wt % or less, or 0.1 wt % or less.

As described above, the refractory composition can comprise, in percent by total mass of the refractory composition (as measured by XRF and/or SEM-EDS analysis), at least 0.25% calcium oxide, or any sub-range subsumed therein, such as, for example, at least 0.7%, at least 0.9%, at least 1.0%, at least 1.5%, at least 2.0%, at least 2.5%, at least 3.0%, 0.5-15.0%, 0.5-10.0%, 0.5-9.9%, 0.5-5.0%, 0.5-3.0%, 0.5-2.5%, 1.0-5.0%, or 1.0-3.0%. In some cases, the refractory composition can comprise less than 2.3% calcium oxide, or greater than 2.5% calcium oxide. In some cases, the refractory composition can comprise less than 2.1% calcium oxide, or greater than 2.7% calcium oxide. In some cases, the refractory composition can comprise less than 2.0% calcium oxide, or greater than 2.8% calcium oxide. In some cases, the refractory composition can comprise less than 1.9% calcium oxide, or greater than 2.9% calcium oxide.

The refractory composition can comprise at least 0.1% magnesia, or any sub-range subsumed therein, such as, for example, at least 1.0%, at least 2.0%, at least 5.0%, at least 10.0%, at least 15.0%, up to 75.0%, up to 50.0%, up to 25.0%, up to 20.0%, up to 15.0%, up to 10.0%, up to 7.0%, up to 5.0%, up to 1.0%, up to 0.5%, 0.1-15.0%, or 5.0-15.0%. In some cases, the refractory composition can comprise less than 5.9% magnesia, or greater than 6.1% magnesia. In some cases, the refractory composition can comprise less than 5.5% magnesia, or greater than 6.5% magnesia. In some cases, the refractory composition can comprise less than 5.0% magnesia, or greater than 7.0% magnesia.

As described above, in some cases, the refractory composition can comprise, in percent by total mass of the refractory composition (as measured by XRF and/or SEM-EDS analysis), at least 0.25% and up to 15.0% titanium dioxide, or any sub-range subsumed therein, such as, for example, up to 12.0%, up to 10.0%, up to 5%, up to 3%, at least 0.5%, at least 1.0%, at least, 2.0%, at least 2.5%, at least 3.0%, at least 5.0%, 0.1-15.0%, 0.25-15.0%, 1.0-15.0%, 1.0-12.0%, 1.0-10.0%, 2.5-15.0%, 2.5-12.0%, 2.5-10.0%, 3.0-15.0%, 3.0-12.0%, 0.1-9.5%, 3.0-10.0%, or 3.0-9.0%. The composition may also comprise these amounts of titanium dioxide as supplied in fine-grain particle form (i.e., having particle sizes less than less than 150 micrometers (−100 mesh)). In some cases, the refractory composition can comprise, in percent by total mass of the refractory composition (as measured by XRF and/or SEM-EDS analysis) at least 90.0% and up to 99.0% summed alumina and titanium dioxide, or any sub-range subsumed therein, such as, for example, 90.0-98.0%, 92.0-99.0%, 92.0-98.0%, 94.0-99.0%. 94.0-98.0%, 95.0-99.0%, 95.0-98.0%, 96.0-99.0%, or 96.0-98.0%.

In some cases, the refractory composition can comprise, in percent by total mass of the refractory composition, at least 80.0% alumina particles (including both coarse-grain and fine-grain alumina particles), or any sub-range subsumed therein, such as, for example, at least 83.0%, at least 85.0%, at least 89.0%, at least 90.0%, at least 91.0%, at least 93.0%, at least 95.0%, at least 97.0%, 80.0-98.0%, 80.0-95.0%, 83.0-95.0%, or 90.0-95.0%. In cases where the refractory composition comprises at least 80.0% alumina particles, at least 35.0% of the total mass of the alumina particles can have a particle size of at least 150 micrometers (+100 mesh), and at least 35.0% of the total mass of the alumina particles can have a particle size of less than 150 micrometers (−100 mesh). In some cases, at least 30.0% of the total mass of the alumina particles can have a particle size of at least 300 micrometers (+48 mesh), and at least 35.0% of the total mass of the alumina particles can have a particle size of less than 150 micrometers (−100 mesh). In some cases, at least 30.0% of the total mass of the alumina particles can have a particle size of 300-600 micrometers (+48 mesh; −28 mesh), and at least 35.0% of the total mass of the alumina particles have a particle size of less than 150 micrometers (−100 mesh).

The invention described in this specification includes methods for forming a working lining in a metallurgical vessel. The methods comprise applying the refractory composition described above over at least a portion of a melt-contacting surface of a metallurgical vessel. The refractory composition can be applied by spraying, gunning, shotcreting, vibrating (e.g., dry-vibrating), casting (e.g., pre-casting), troweling or other manual application, or positioning of preformed refractory shapes formed from a refractory composition (e.g., refractory boards or wall panels). The refractory composition can be formulated in terms of chemical composition and particle size to both: (i) produce working linings in metallurgical vessels that are infiltrated by the molten metal, as described above; and (ii) possess workability for any given application technique. For example, the relative amounts of coarse-grain refractory particles, fine-grain refractory particles, binder components, additives, and water can be determined by persons having ordinary skill in the art, within the limitations described above, and without undue experimentation, to provide refractory compositions that are workable with the described application techniques. Additionally, persons having ordinary skill in the art, within the limitations described above, and without undue experimentation, can determine drying conditions, or curing conditions, or pre-heating conditions, as applicable to a given application technique and metallurgical operation.

The refractory compositions, when applied to a metallurgical vessel and dried or cured (if applicable), produce refractory layers having apparent of at least 20%, or any sub-range subsumed therein, such as, for example, at least 21%, at least 22%, at least 23%, at least 25%, at least 30%, at least 35%, at least 40%, at least 45%, at least 50%, 20-60%, 25-55%, 25-50%, 30-55%, 35-55%, or 45-55%. The apparent porosity of the applied and dried or cured, as applicable, refractory composition can be determined in accordance with ASTM C830-00(2016): Standard Test Methods for Apparent Porosity, Liquid Absorption, Apparent Specific Gravity, and Bulk Density of Refractory Shapes by Vacuum Pressure, which is incorporated-by-reference into this specification.

The refractory compositions can be applied over at least a portion of a melt-contacting surface of a metallurgical vessel to produce a refractory layer having a thickness ranging, for example, from 1 millimeter (0.04 inch) to 65 millimeters (2.6 inches), or any sub-range subsumed therein, such as, for example, from 10-50 millimeters (0.4-2 inches), 15-50 millimeters (0.6-2 inches), 20-50 millimeters (0.8-2 inches), or 25-50 millimeters (1-2 inches). The refractory compositions described in this specification can be used to produce a working lining portion of the refractory lining structures described in U.S. Provisional Patent Application No. 62/551,509, filed on Aug. 29, 2017, which is the priority application for International Application PCT/US2018/047253, filed on Aug. 21, 2018, (International Publication No. WO 2019/046042 A1, which is incorporated-by-reference into this specification.

The invention described in this specification includes working linings for metallurgical vessels formed from the refractory compositions described above. The working linings comprise a refractory phase comprising the coarse-grain refractory particles, and a metallic phase comprising iron or steel wetting and infiltrating the coarse-grain refractory particles of the refractory phase. The invention described in this specification also includes metallurgical vessels comprising a floor and a sidewall extending from the floor, and a working lining formed from the refractory compositions described above applied over at least a portion of the floor and the sidewall of the metallurgical vessels.

In some cases, the refractory compositions can be used to form single-use working linings in metallurgical vessels such as, for example, tundishes for the continuous casting of steel. As used in this specification, including the claims, "single-use working linings" means working linings that contact molten metal one time before removal from a metallurgical vessel after the completion of a metallurgical operation. Single-use working linings do not contact molten metal multiple times between which all of the molten metal is drained or otherwise removed from the metallurgical vessel.

For example, in tundishes for the continuous casting of steel, single-use working linings are applied for a single continuous casting campaign during which at least a portion of the working lining is in constant contact with molten metal. After completion of the campaign, residual steel that did not drain from the tundish is cooled and solidified to form a skull, which adheres to the single-use working lining. The metal skull and adhered working lining are removed from the tundish before re-applying a new single-use working lining for a subsequent continuous casting campaign. This is in contrast to the working linings applied to ladles, for example, which contact molten metal on multiple, discrete occasions between which essentially all of the molten metal drains from the ladle.

The invention described in this specification also includes methods for using metallurgical vessels comprising working linings formed from the refractory compositions described above. For example, a method may comprise performing a continuous casting process wherein molten steel is contained in a tundish comprising a single-use working lining formed from a refractory composition as described above. Although the refractory compositions have been described above in the context of tundishes for use in steel continuous casting processes, it is understood that the refractory compositions can be used in other metallurgical vessels for both ferrous and nonferrous applications, especially as single-use working linings, such as, for example, in casting runners.

EXAMPLES

Example I

A melt test of four different refractory compositions was performed using a 25 kilogram hot-rolled bar of AISI 1018 steel remelted in a crucible having a working lining divided into four separate zones. Each zone of the working lining had a different refractory composition, as shown below in Table 1 (in percentages by total mass of the refractory compositions). In the refractory compositions corresponding to zones 2, 3, and 4, the corresponding 3.0%, 6.0%, and 9.0% titanium dioxide replaced equal amounts of alumina.

The four refractory compositions were identical except for the titanium dioxide content and alumina content. All four refractory compositions contained about 54-59% coarse-grain tabular alumina particles and about 26-36% fine-grain tabular alumina particles, depending on titanium dioxide content. The components of the zone 2, 3 and 4 compositions are within the ranges from 88% to 97% alumina, 0.1% to 1.1% silica, 0.25% to 2.1% calcium oxide, and 0.25% to 9.5% titanium dioxide. The iron oxide is an incidental impurity in other components of the compositions and is not itself an additive component. Ratios of alumina to titanium dioxide in the zone 2, 3 and 4 compositions are 31.4, 15.3 and 9.8, respectively, and are within the range from 35 to 8.

TABLE 1

| Component | Zone 1 | Zone 2 | Zone 3 | Zone 4 |
| --- | --- | --- | --- | --- |
| Alumina | 97.3 | 94.3 | 91.3 | 88.3 |
| Silica | 1.0 | 1.0 | 1.0 | 1.0 |
| Iron oxide | 0.1 | 0.1 | 0.1 | 0.1 |
| Calcium oxide | 0.7 | 0.7 | 0.7 | 0.7 |
| Magnesia | 0.1 | 0.1 | 0.1 | 0.1 |
| Alkali oxides | 0.1 | 0.1 | 0.1 | 0.1 |
| Titanium dioxide | 0.0 | 3.0 | 6.0 | 9.0 |

The steel was melted in the lined crucible in a 100 kilowatt Inductotherm Mark IV induction melting furnace blanketed in argon. The solidified steel mass and attached skull of the working lining were removed from the crucible and cross-sectioned. A photograph of the cross-sectioned sample is shown in FIG. 1, including indication of the four zones of the working lining skull. Solidified steel mass 2 is surrounded by zone 1 refractory composition 10, zone 2 refractory composition 13, zone 3 refractory composition 16, and zone 4 refractory composition 19.

Figure 2A:
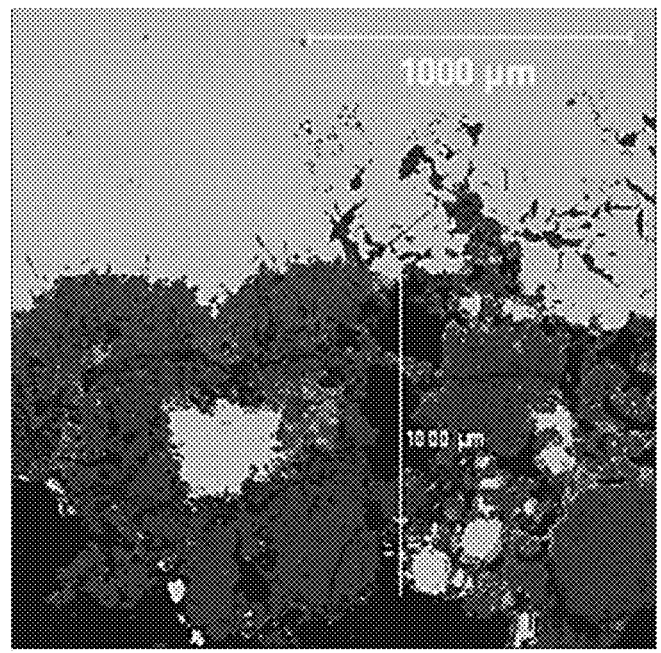
FIGS. 2A and 2B are scanning electron microscopy images of the steel-skull interface of a first zone (0% $TiO_2$) of the steel melt test sample shown in FIG. 1.
Figure 2B:
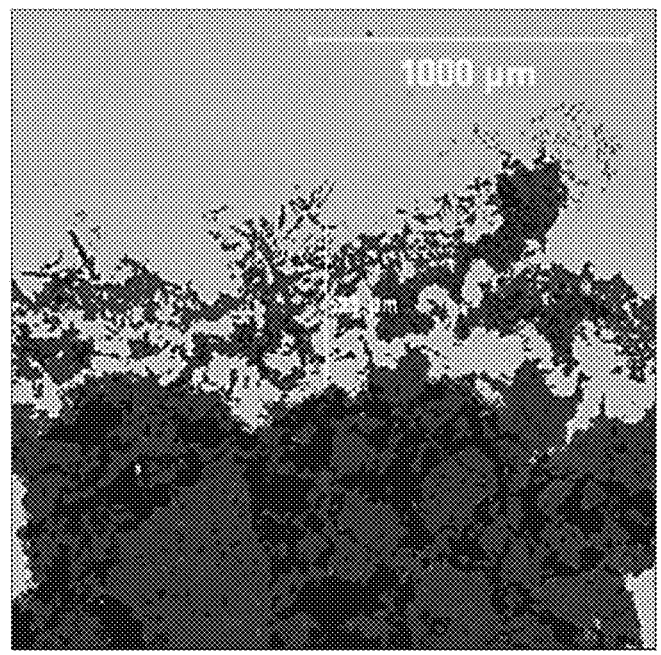
Figure 3A:
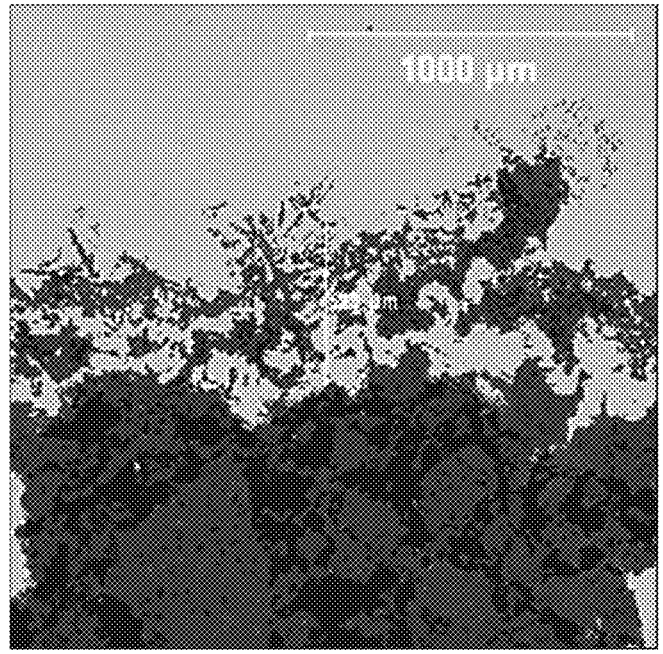
FIGS. 3A and 3B are scanning electron microscopy images of the steel-skull interface of a second zone (3% $TiO_2$) of the steel melt test sample shown in FIG. 1.
Figure 3B:
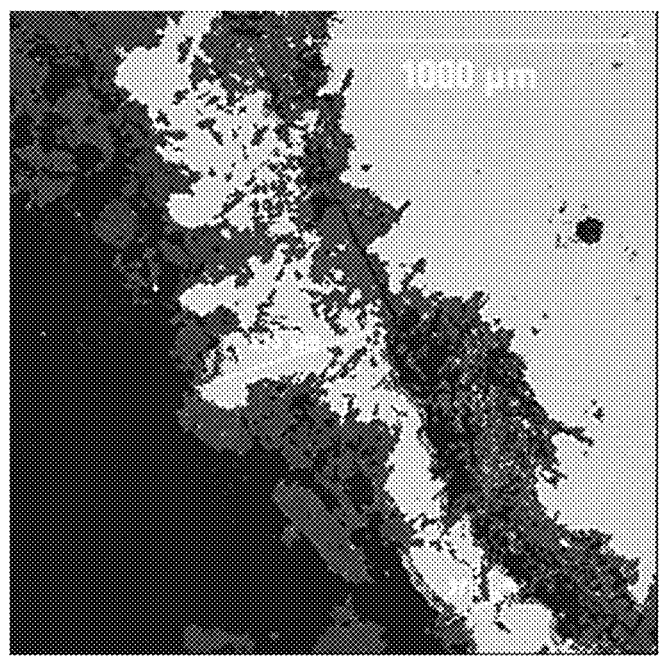
Figure 4A:
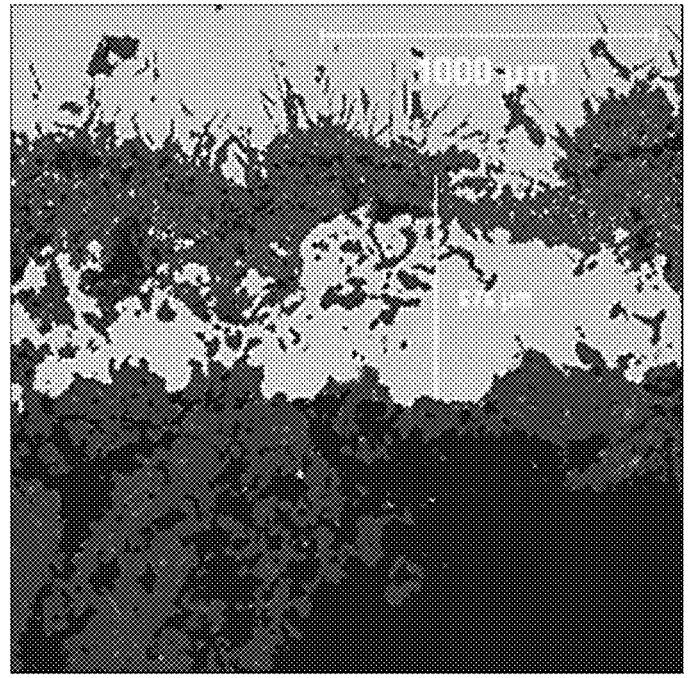
FIGS. 4A and 4B are scanning electron microscopy images of the steel-skull interface of a third zone (6% $TiO_2$) of the steel melt test sample shown in FIG. 1.
Figure 4B:
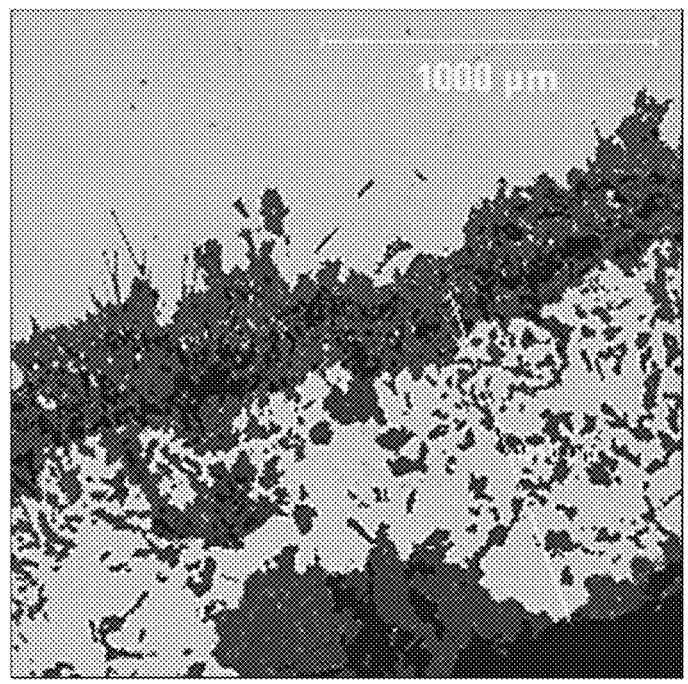
Figure 5A:
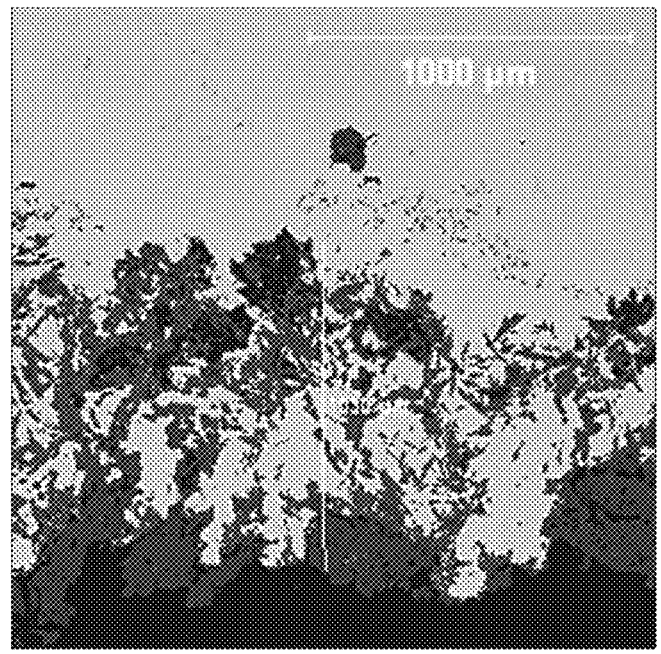
FIGS. 5A and 5B are scanning electron microscopy images of the steel-skull interface of a fourth zone (9% $TiO_2$) of the steel melt test sample shown in FIG. 1.
Figure 5B:
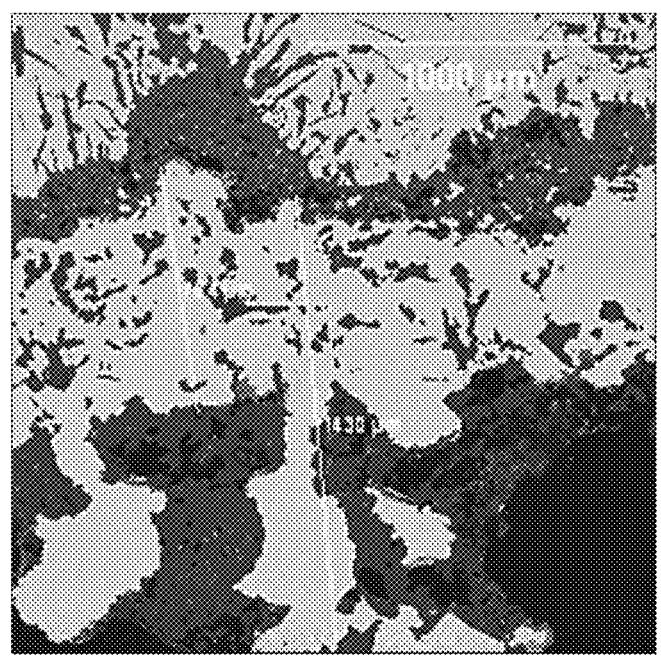

Scanning electron microscopy (SEM) was performed on the interfaces between the solidified metal and the attached working lining skulls. FIGS. 2A and 2B show representative SEM images of Zone 1 (0% $TiO_2$), FIGS. 3A and 3B show representative SEM images of Zone 2 (3% $TiO_2$), FIGS. 4A and 4B show representative SEM images of Zone 3 (6% $TiO_2$), and FIGS. 5A and 5B show representative SEM images of Zone 4 (9% $TiO_2$). All four refractory compositions were at least partially infiltrated with steel, forming refractory-steel composite anti-oxidation barrier layers. Increased titanium dioxide content correlated with increased depth and uniformity of steel penetration into the refractory composition, as indicated below in Table 2.

TABLE 2

| Zone | $TiO_2$ content (%) | Penetration Depth (mm) |
| --- | --- | --- |
| 1 | 0.0 | 0.0-0.5 |
| 2 | 3.0 | 0.5-0.8 |
| 3 | 6.0 | 0.7-1.0 |
| 4 | 9.0 | 1.0-1.4 |

Figure 6A:
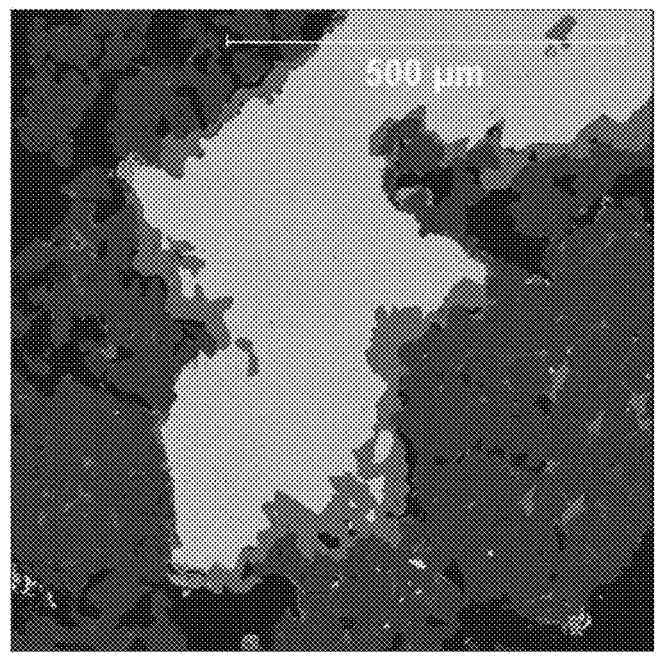
FIG. 6A is a scanning electron microscopy image of the fourth zone (9% $TiO_2$) of the working lining skull from the steel melt test sample shown in FIG. 1.
Figure 6B:
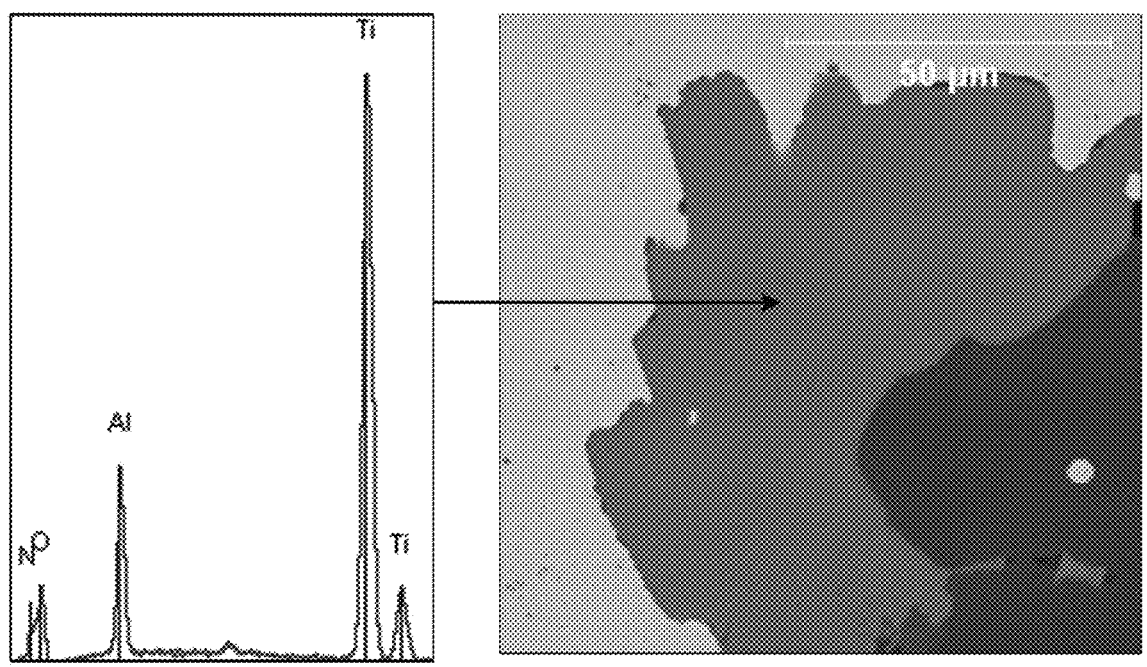
FIG. 6B is a magnified scanning electron microscopy image showing a portion of the image shown in FIG. 6A, and also showing the results of an energy-dispersive spectroscopy analysis performed on the magnified portion of the working lining skull.

Referring to FIG. 6A, SEM analysis showed a surface coating present on the coarse-grain alumina particles in the refractory composition of zone 4 (9% $TiO_2$). Energy-dispersive spectroscopy (EDS) was performed on this surface coating, which indicated a titanium-aluminum oxy-nitride composition (FIG. 6B). This confirmed that the titanium dioxide was reacting with, and modifying the surface chemistry of, the coarse-grain alumina particles. This is believed to have increased the wettability of the steel on the coarse-grain alumina particles, and therefore contributed to the increased uniformity and depth of penetration of the steel infiltrating the coarse-grain alumina particles.

ASPECTS OF THE INVENTION

Various aspects of the invention include, but are not limited to, the following numbered clauses.

1. A refractory composition for forming a working lining in a metallurgical vessel, the refractory composition comprising, in percent by total mass of the refractory composition:
    at least 20.0% coarse-grain refractory particles having a particle size of at least 150 micrometers (+100 mesh), wherein the coarse-grain refractory particles comprise alumina particles, magnesia particles, magnesium aluminate spinel particles, zirconia particles, or doloma particles, or a combination of any thereof; and
    one or more of:
        (i) at least 1.5% additive calcium oxide; or
        (ii) at least 5.0% low-magnesia oxide, fine-grain refractory particles having a particle size of less than 150 micrometers (−100 mesh); or
        (iii) at least 0.25% additive calcium oxide and at least 5.0% low-magnesia oxide, fine-grain refractory particles having a particle size of less than 150 micrometers (−100 mesh); or
        (iv) at least 0.25% titanium dioxide.
2. The refractory composition of clause 1, comprising, in percent by total mass of the refractory composition:
    at least 50.0% coarse-grain refractory particles; and
    at least 25.0% low-magnesia oxide, fine-grain refractory particles.
3. The refractory composition of clause 1 or clause 2, comprising, in percent by total mass of the refractory composition:
    at least 55.0% coarse-grain refractory particles; and
    at least 30.0% low-magnesia oxide, fine-grain refractory particles.
4. The refractory composition of any one of clauses 1-3, comprising, in percent by total mass of the refractory composition:
    at least 80.0% alumina;
    up to 3.0% silica;
    up to 0.5% iron(III) oxide;
    0.5-10.0% calcium oxide;
    at least 0.1% magnesia;
    up to 1.0% alkali oxides; and
    up to 15.0% titanium dioxide.
5. The refractory composition of any one of clauses 1-4, comprising, in percent by total mass of the refractory composition:
    at least 90.0% alumina;
    up to 1.1% silica;
    up to 0.3% iron(III) oxide;
    0.5-9.9% calcium oxide;
    up to 7.0% magnesia;
    up to 0.5% alkali oxides; and
    0.1-9.5% titanium dioxide.
6. The refractory composition of any one of clauses 1-5, wherein the coarse-grain refractory particles are essentially free of silica.
7. The refractory composition of any one of clauses 1-6, wherein the composition is essentially free of iron oxide
8. The refractory composition of any one of clauses 1-7, wherein the coarse-grain refractory particles are essentially free of calcium oxide, olivine, and silica.

9. The refractory composition of any one of clauses 1-8, wherein the coarse-grain refractory particles comprise alumina particles having a particle size of at least 300 micrometers (+48 mesh).

10. The refractory composition of any one of clauses 1-9, comprising, in percent by total mass of the refractory composition, 0.25% to 15.0% titanium dioxide.

11. The refractory composition of any one of clauses 1-10, comprising, in percent by total mass of the refractory composition, 90.0% to 99.0% summed alumina and titanium dioxide.

12. The refractory composition of any one of clauses 1-11, comprising, in percent by total mass of the refractory composition, 25.0% to 55.0% low-magnesia oxide, fine-grain refractory particles.

13. The refractory composition of clause 12, comprising, in percent by total mass of the refractory composition, 30.0% to 40.0% low-magnesia oxide, fine-grain refractory particles.

14. The refractory composition of any one of clauses 1-13, wherein the low-magnesia oxide, fine-grain refractory particles comprise alumina particles having a mean particle size of less than 150 micrometers (−100 mesh).

15. The refractory composition of any one of clauses 1-14, comprising, in percent by total mass of the refractory composition, at least 80.0% alumina particles, preferably at least 90% alumina particles.

16. The refractory composition of clause 15 wherein at least 35.0% of the total mass of the alumina particles have a particle size of at least 150 micrometers (+100 mesh), preferably wherein at least 30.0% of the total mass of the alumina particles have a particle size of at least 300 micrometers (+48 mesh), and at least 35.0% of the total mass of the alumina particles have a particle size of less than 150 micrometers (−100 mesh).

17. The refractory composition of any one of clauses 15-16, wherein at least 30.0% of the total mass of the alumina particles have a particle size of 300-600 micrometers (+48 mesh; −28 mesh), and at least 35.0% of the total mass of the alumina particles have a particle size of less than 150 micrometers (−100 mesh).

18. The refractory composition of any one of clauses 1-17, comprising, in percent by total mass of the refractory composition:
at least 25.0% low-magnesia oxide, fine-grain refractory particles; and
0.5-10.0% additive calcium oxide.

19. The refractory composition of any one of clauses 1-18, comprising, in percent by total mass of the refractory composition:
25.0-55.0% low-magnesia oxide, fine-grain refractory particles; and
1.0-5.0% additive calcium oxide.

20. The refractory composition of any one of clauses 1-19, comprising, in percent by total mass of the refractory composition, 45-75% coarse-grain refractory particles.

21. A method for forming a single-use working lining in a metallurgical vessel comprising applying the refractory composition of any one of clauses 1-20 over at least a portion of a melt-contacting surface of a metallurgical vessel, wherein the refractory composition is applied by spraying, gunning, shotcreting, vibrating, casting, troweling, or positioning of preformed refractory shapes formed from the refractory composition, or a combination of any thereof.

22. A working lining for a metallurgical vessel formed from the refractory composition of any one of clauses 1-20, the working lining comprising:
a refractory phase comprising the coarse-grain refractory particles; and
a metallic phase comprising iron or steel wetting and infiltrating the coarse-grain refractory particles of the refractory phase.

23. The working lining of claim 22, wherein the working lining is a single-use working lining.

24. A metallurgical vessel comprising:
a floor and a sidewall extending from the floor; and
the working lining of clause 22 or clause 23 applied over at least a portion of the floor and the sidewall of the metallurgical vessel.

25. The metallurgical vessel of clause 24, wherein the metallurgical vessel comprises a continuous casting tundish.

26. A working lining for a metallurgical vessel comprising:
a refractory phase comprising coarse-grain refractory particles having a particle size of at least 150 micrometers (+100 mesh), wherein the coarse-grain refractory particles comprise alumina particles, magnesia particles, magnesium aluminate spinel particles, zirconia particles, or doloma particles, or a combination of any thereof; and
a metallic phase comprising iron or steel wetting and infiltrating the coarse-grain refractory particles of the refractory phase;
wherein the working lining is formed from a refractory composition comprising, in percent by total mass of the refractory composition:
at least 20.0% of the coarse-grain refractory particles; and
one or more of:
(i) at least 1.5% additive calcium oxide; or
(ii) at least 5.0% low-magnesia oxide, fine-grain refractory particles having a particle size of less than 150 micrometers (−100 mesh); or
(iii) at least 0.25% additive calcium oxide and at least 5.0% low-magnesia oxide, fine-grain refractory particles having a particle size of less than 150 micrometers (−100 mesh); or
(iv) at least 0.25% titanium dioxide.

27. A method for forming the working lining of clause 26, the method comprising applying the refractory composition over at least a portion of a melt-contacting surface of a metallurgical vessel, wherein the refractory composition is applied by spraying, gunning, shotcreting, vibrating, casting, troweling, or positioning of preformed refractory shapes formed from the refractory composition, or a combination of any thereof.

28. The method of clause 27, wherein the refractory composition forms an applied refractory layer having an apparent porosity of at least 22%.

29. The method of clause 28, wherein the applied refractory layer has an apparent porosity of 25-55%.

30. The method of any one of clauses 27-29, wherein the refractory layer is applied by spraying.

31. A metallurgical vessel comprising:
a floor and a sidewall extending from the floor; and
the working lining of clause 26 applied over at least a portion of the floor and the sidewall of the metallurgical vessel.

32. The metallurgical vessel of clause 31, wherein the metallurgical vessel comprises a continuous casting tundish.

Various features and characteristics are described in this specification and illustrated in the drawings to provide an overall understanding of the invention. It is understood that the various features and characteristics described in this specification and illustrated in the drawings can be combined in any operable manner regardless of whether such features and characteristics are expressly described or illustrated in combination in this specification. The Inventors and the Applicant expressly intend such combinations of features and characteristics to be included within the scope of this specification, and further intend the claiming of such combinations of features and characteristics to not add new subject matter to the application. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new subject matter to the specification or claims, and will comply with written description, sufficiency of description, and added matter requirements (e.g., 35 U.S.C. § 112(a) and Article 123(2) EPC). The invention can comprise, consist of, or consist essentially of the various features and characteristics described in this specification. In some cases, the invention can also be essentially free of any component or other feature or characteristic described in this specification.

Also, any numerical range recited in this specification includes the recited endpoints and describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements (e.g., 35 U.S.C. § 112(a) and Article 123(2) EPC).

The grammatical articles "one", "a", "an", and "the", as used in this specification, are intended to include "at least one" or "one or more", unless otherwise indicated or required by context. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the invention. Further, the use of a singular noun includes the plural, and the use of a plural noun includes the singular, unless the context of the usage requires otherwise.

Any patent, patent application, publication, or other extrinsic document identified in this specification is incorporated by reference into this specification in its entirety unless otherwise indicated, but only to the extent that the incorporated material does not conflict with descriptions, definitions, statements, illustrations, and the like, expressly set forth in this specification. As such, and to the extent necessary, the express descriptions set forth in this specification supersede any conflicting material incorporated by reference. Any material, or portion thereof, that is incorporated by reference into this specification, but which conflicts with the express descriptions set forth in this specification, is only incorporated to the extent that no conflict arises between that incorporated material and the express descriptions. Applicant reserves the right to amend this specification to expressly recite any subject matter, or portion thereof, incorporated by reference. The amendment of this specification to add such incorporated subject matter will comply with written description and sufficiency of description requirements (e.g., 35 U.S.C. § 112(a) and Article 123(2) EPC).

What is claimed is:

1. A refractory composition for forming a working lining in a metallurgical vessel, the refractory composition comprising, in percent by total mass of the refractory composition:
   at least 20.0% coarse-grain refractory particles having a particle size of at least 150 micrometers (+100 mesh), wherein the coarse-grain refractory particles include alumina particles, and further comprises magnesia particles, magnesium aluminate spinel particles, zirconia particles, or doloma particles, or a combination of any thereof;
   at least 0.25% titanium dioxide; and
   one or more of:
   (i) at least 0.5% additive calcium oxide, fine-grain refractory particles having a particle size of less than 150 micrometers (-100 mesh); or
   (ii) at least 5.0% low-magnesia oxide, fine-grain refractory particles having a particle size of less than 150 micrometers (-100 mesh), the low-magnesia oxide containing less than 50% magnesia by total mass of the low-magnesia oxide; or
   (iii) at least 0.25% additive calcium oxide and at least 5.0% low-magnesia oxide, fine-grain refractory particles having a particle size of less than 150 micrometers (-100 mesh); and
   wherein the refractory composition comprises, in percent by total mass of the refractory composition:
   at least 80.0% alumina comprising coarse-grain alumina particles and fine-grain alumina particles, wherein the coarse-grain alumina particles of the at least 80% alumina concurrently include the alumina particles comprised within the at least 20.0% coarse-grain refractory particles having the particle size of at least 150 micrometers (+100 mesh);
   up to 3.0% silica;
   up to 0.5% iron (III) oxide;
   0.5-5.0% calcium oxide;
   at least 0.1% magnesia;
   up to 1.0% alkali oxides; and
   from 0.25 up to 15.0% titanium dioxide.

2. The refractory composition of claim 1, comprising, in percent by total mass of the refractory composition:
   at least 50.0% coarse-grain refractory particles; and
   at least 25.0% low-magnesia oxide, fine-grain refractory particles.

3. The refractory composition of claim 1, wherein the coarse-grain refractory particles are essentially free of silica.

4. The refractory composition of claim 1, wherein the composition is essentially free of iron oxide.

5. The refractory composition of claim 1, wherein the coarse-grain refractory particles are essentially free of calcium oxide, olivine, and silica.

6. The refractory composition of claim 1, wherein the coarse-grain refractory particles comprise alumina particles having a particle size of at least 300 micrometers (+48 mesh).

7. The refractory composition of claim 1, comprising in percent by total mass of the refractory composition, 90.0% to 99.0% summed alumina and titanium dioxide.

8. The refractory composition of claim 1, wherein the low-magnesia oxide, fine-grain refractory particles comprise alumina particles having a mean particle size of less than 150 micrometers (-100 mesh).

9. The refractory composition of claim 1, comprising, in percent by total mass of the refractory composition, at least 90.0% alumina particles.

10. An applied refractory layer comprising the refractory composition of claim 1, wherein the applied refractory layer has an apparent porosity of at least 22%, the refractory layer formed over at least a portion of a melt-contacting surface of a metallurgical vessel.

11. A method for forming a single-use working lining in a metallurgical vessel comprising applying the refractory composition of claim 1 over at least a portion of a melt-contacting surface of a metallurgical vessel, wherein the refractory composition is applied by spraying, gunning, shotcreting, vibrating, casting, troweling, or positioning of preformed refractory shapes formed from the refractory composition, or a combination of any thereof.

12. A single-use working lining formed over at least a portion of a melt-contacting surface of a metallurgical vessel, the working lining formed from the refractory composition of claim 1, the working lining comprising:
a refractory phase comprising the coarse-grain refractory particles; and
a metallic phase comprising iron or steel at least partially displacing the low-magnesia oxide, fine-grain refractory particles, wetting the coarse-grain refractory particles of the refractory phase, and infiltrating the working lining.

13. A metallurgical vessel comprising:
a floor and a sidewall extending from the floor; and
the single-use working lining of claim 12 applied over at least a portion of the floor and the sidewall of the metallurgical vessel.

14. The metallurgical vessel of claim 13, wherein the metallurgical vessel comprises a continuous casting tundish.

\* \* \* \* \*